United States Patent [19]

Beery et al.

[11] Patent Number: 4,888,198

[45] Date of Patent: Dec. 19, 1989

[54] COMPRESSED TEXTURIZED SOY PROTEIN PRODUCT AND PROCESS FOR MAKING SAME

[75] Inventors: Kenneth E. Beery; Arthur H. Konwinski, both of Fort Wayne, Ind.

[73] Assignee: Central Soya Company, Fort Wayne, Ind.

[21] Appl. No.: 230,852

[22] Filed: Aug. 10, 1988

Related U.S. Application Data

[63] Continuation of Ser. No. 941,993, Dec. 15, 1986, abandoned.

[51] Int. Cl.$^4$ ............................................... A23J 1/14
[52] U.S. Cl. ..................................... 426/656; 426/445
[58] Field of Search ........................ 426/656, 634, 445

[56] References Cited

U.S. PATENT DOCUMENTS 3,843,816 10/1974 Touba ................................. 426/656
3,886,298 5/1975 Hayes, Jr. et al. ................. 426/656
3,978,244 8/1976 Sair ..................................... 426/445

*Primary Examiner*—Donald E. Czaja
*Assistant Examiner*—Celine T. Callahan
*Attorney, Agent, or Firm*—Allegretti & Witcoff, Ltd.

[57] ABSTRACT

This invention encompasses compressed texturized soy protein products having a protein content of greater than 45%, a moisture content of about 5 to 15%, a bulk density of about 30 to 40% lbs/cuft and an expansion capacity of about 50 to 150% by volume upon rehydration. The invention provides a high density rapidly rehydrating and expanding food product which resists fragmentation under ordinary commercial and shipping conditions and offers economical advantages when stored and shipped over existing products on the market. The invention also provides a method for making such a compressed texturized soy protein comprising first texturizing conventional soy protein ingredients having a fibrous cellular matrix, such as soy flours and soy protein concentrates and then adjusting the moisture content of structured particles for said soy protein ingredients to about 10 to 20%; and finally compressing said particles into a cake which is capable of expanding upon rehydration 50 to 150% of its original volume.

5 Claims, 1 Drawing Sheet

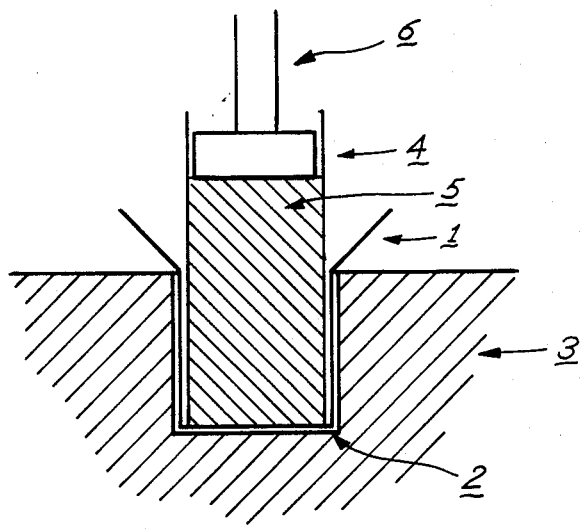

COMPRESSED TEXTURIZED SOY PROTEIN PRODUCT AND PROCESS FOR MAKING SAME

BACKGROUND OF THE INVENTION

This is a continuation of application Ser. No. 941,993, filed Dec. 15, 1986, now abandoned.

1. Field of the Invention

This invention is in the field of processing and packaging soy protein products, such as soybean meal, soy flours and soy protein concentrates for human consumption and animal feeds.

2. Prior Art

U.S. Pat. No. 4,153,738 discloses the formation of toasted soy protein flakes, obtained from steam conditioned/flakes cracked soybeans which have been de-oiled (defatted) normally with the aid of an organic solvent, i.e. hexane, by texturizing said flakes in an Anderson expeller or in a similar later model screw press model employing the combination of steam/temperature and pressure, fragmenting the texturized protein, hydrating the fragments (moisture content 12 to 25%), and rolling same into a flaked shape at a temperature that will impart sufficient toasting to the flakes.

An article by Rahman et al in the Journal of Food Processing and Preservation 2:285–298 (1979) discloses compressed freeze dried foods having a natural cellular structure with collapsed void spaces as a result of moisture removal during the drying step.

U.S. Pat. No. 3,463,641 teaches high pressure compacting of a variety of foods and food ingredients, including soy protein products into a disk for color analysis.

British patent No. 588,354 discloses compression of unspecified food products.

A number of patents are directed to texturizing soy protein by heat and pressure U.S. Pat. No. 4,057,656 (Spiel); U.S. Pat. No. 4,103,034 (Ronai); and U.S. Pat. No. 4,153,738. In addition, U.S. Pat. No. 3,843,816 (Towba) and U.S. Pat. No. 3,886,298 (Hayes) disclose texturizing protein by heating and compressing followed by expansion.

In the present invention, an approach was found to creating a fabricated spongelike material made from defatted soy protein particulates, namely defatted soy flours and soy protein concentrates which are capable of being compressed in molded cavities to form dense unitary structures having sufficient integrity to withstand easy fragmentation during shipping and commercial handling yet capable of ready rehydration. The generation of sponge-like character is accomplished through a texturizing process. This texturizing process provides cellular structure similar to natural cellular structures.

More specifically, it was discovered that soy flour (50% protein) and soy protein concentrate (65 to 72% protein) could not be simply wetted and compressed into a high density product because the steam conditioning and flaking prior to the deoiling process with solvents apparently obliterates the void spaces in their cellular structure, in contrast to naturally textured fruits and vegetables, such as those described in the prior art. These natural products, by not having been subjected to any severe physical treatment, will retain their original porous structure even after freeze drying, and are capable of being rehydrated by virtue of the existing void spaces in their cellular structure.

It was discovered that soy flours and protein concentrates had to first be texturized by extruding these products in a moistened state, accomplished by admixing water to the dry material. Only after such texturization and adjusting the water content to about 10 to 20% was it possible to compress the material, applying compression pressures of 1,500 to 3,000 lbs/sq. in. in a manner that resulted in a high density product which would greatly expand on rehydration.

BRIEF DESCRIPTION OF THE INVENTION

This invention encompasses compressed texturized soy protein products having a protein content greater than 45%, a moisture content of about 5 to 15%, a bulk density of about 30 to 40 lbs/cu. ft., and an expansion capacity upon rehydration of about 50 to 150%. The invention also includes a method for making such compressed texturized soy protein products which includes the steps of texturizing dry powdered soy flour or protein concentrate into structured porous particles by admixing moisture and then extruding the moistened soy protein mass under elevated temperature and pressure, and finally drying same to a moisture content of about 12 to 18%; then compressing the textured particles into a cake. The resulting compressed cake expands 50 to 150% of its original volume upon rehydration. Unexpectedly it has been found that failure to texturize the soy protein product prior to compression results in a hard product which is slow to rehydrate and difficult to break into small parts. Texturizing soy flour or protein concentrate, on the other hand, prior to compression results in a product which readily expands on rehydration to provide a desired texture and consistency. The invention provides an edible soy protein ingredient for human consumption, such as a soy protein extender in meats, poultry and fish. It has also some usefulness in animal feeds and pet foods.

BRIEF DESCRIPTION OF THE FIGURES

FIG. 1 illustrates the method for compressing texturized soy protein and packaging the compressed cake.

DETAILED DESCRIPTION OF THE INVENTION

The invention encompasses compressed texturized soy protein products having a protein content greater than 45%, preferably 50 to 72%; a moisture content of about 5 to 15%, and a bulk density of about 30 to 40 lbs/cu. ft, preferably about 35 lbs/cu. ft. The compressed texturized soy protein products of the invention are characterized as being easy to handle, store and ship. They are resistant to fragmentation or flaking and rehydrate rapidly.

Powdered high protein soy flour of protein concentrate is texturized into structured porous particles. Soy flour suitable for the use in this invention is the screened, graded product obtained from defatted flakes (after the removal of the oil by expelling or extraction) derived from selected, sound, clean, dehulled soybeans, except that full-fat soy flour is not subjected to expelling or extraction and contains all of the oil originally present in the soybean; said flour is ground finely enough to pass through a 100-mesh or smaller screen and is usually available in various sizes to meet specific requirements. The protein content of soy flours as a generic class is 40 to 60% ($N \times 6.25$), as defined by the National Soy Processors Association (NSPA).

According to the tentative Common and Usual Name Regulation (1978) by the Food and Drug Administration, soy protein concentrate suitable for use in this invention is the product prepared from high quality, sound, clean, dehulled soybeans by removing most of the oil and water soluble non-protein constituents and shall contain not less than 65% protein (N×6.25) on a moisture-free basis.

Other types of soy protein are described in "Soybeans: Chemistry and Technology", Vol. I Proteins, ed. by Allan K. Smith and Sidney J. Circle, The AVI Publishing Company, Inc., 1972.

Texturizing is preferably accomplished by mixing 15 to 50%, preferably about 30% water with the soy flour or soy protein concentrate to provide a moistened mass, and extruding same to form a extruded texturized porous composition having ample void cellular spaces capable of soaking up liquid upon rehydration. This texturized composition is then preferably broken into smaller structured particles by cutting the extrudate as it emerges from the extruder and milling the cut segments through a sizing screen. The moisture content of the structured particles is adjusted to 12 to 18%, preferably about 14 to 16%. The structured particles are then compressed with conventional equipment at 1,500 to 3,000 lbs/sq. in.

FIG. 1 illustrates the method by which the texturized soy particles are compressed and packaged. A rigid container (1) is placed in a depression (2) of a forming platform (3). A metal insert (4) which conforms to the inner walls of the container (1) is inserted into the depression. The metal insert is then filled with texturized soy protein (5). The texturized protein is compressed with a compression piston (6). The metal insert is removed and the rigid container containing the compressed texturized soy protein cake is removed from the forming platform and sealed. Alternatively the the texturized compressed soy protein can be advantageously compressed and packaged in boxes. The package may contain 0.1 to 50 lbs. size blocks or other shapes specified by the user.

The following example illustrates the present invention but should not be construed to limit it in spirit or scope.

EXAMPLE 1

Soy protein concentrate containing about 71% protein (moisture-free basis) was mixed with sufficient water to result in a mixture having a moisture content of about 30%. The mixture was then processed at a rate of about 150 pounds of soy protein concentrate per hour in a Wenger X-20 extruder equipped with a 25 hp motor and a die containing three $\frac{3}{8}" \times \frac{3}{8}"$ holes. The temperature of the material prior to emerging from the die was 290° F. The extrudate was in the form of a continuous rope of expanded proteinaceous material which was cut into about 0.5 inch lengths by a rotating cutter located adjacent to the die. The extrudate pieces had a bulk density of 17.1 lbs/cu. ft., and were further reduced in size using a Fitzmill equipped with a sizing screen having 5/16"×5/16" holes. The sized pieces were irregularly shaped, having dimensions of about $\frac{1}{4}" \times \frac{3}{8}" \times 1/16"$, a bulk density of about 12 lbs/cu. ft., and a moisture content of about 24%. This material was then dried to a moisture content of about 16%, and the bulk density was about 13.5 lbs/cu. ft. About 45 g of the material was placed into the mold cavity of a Dension Press and compressed for about 3 seconds at about 2150 lbs/sq. in. After removing from the mold, the resultant cake retained its pressed form, and did not become crumbly and break apart. The density of the cake was 0.63 g/cc (39.31 lbs/cu. ft).

The cake's rate of water absorption was as rapid as that of the material which was not pressed. As the cake hydrated, it expanded very quickly until its volume was about equal to the volume of an equal weight of uncompressed, hydrated material.

EXAMPLE 2

A composition according to Example 1, except that soy flour, having a protein content of 53%, was used as the starting material. After texturizing, the product was dried to a moisture content to about 16% prior to its compression under conditions described in Example 1. The cake thus obtained retained its pressed form and showed density and rehydration characteristics similar to those observed for the cake made with soy protein concentrate.

What is claimed is:

1. A method of preparing a texturized and compressed soy protein product comprising the sequential steps of:
   (a) texturizing soy protein into structured porous particles;
   (b) adjusting the moisture content by partially drying the structured porous particles to about 12 to 18%; and
   (c) compressing the moisture adjusted structured porous particles into a cake which expands 50 to 150% by volume upon rehydration, wherein the moisture content is about 5 to 15%.

2. A method according to claim 1, wherein the moisture adjusted structure porous particles are compressed at about 1,500 to 3,000 lbs/sq. in.

3. The method according to claim 1, wherein the moisture adjusted structured porous particles derived therefrom are placed in a packaging container prior to being compressed.

4. The method according to claim 1 wherein the soy protein is powdered soy flour or powdered soy concentrate.

5. A texturized and compressed soy protein product that is resistant to flaking and fragmentation having a protein content greater than 45%, a moisture content of about 12 to 18% in the precompressed state and about 5 to 15% in the compressed state, a bulk density of about 30 to 40 lbs/cu. ft., and an expansion capacity of 50 to 150% upon hydration.

* * * * *